(12) United States Patent
Eitan et al.

(10) Patent No.: US 8,698,341 B2
(45) Date of Patent: Apr. 15, 2014

(54) WIND TURBINE WITH DISCRETELY VARIABLE DIAMETER GEAR BOX

(75) Inventors: Nimrod Eitan, Tel Aviv (IL); Jacob Pozminatir, Rishon Lezion (IL)

(73) Assignee: IQWIND Ltd., Bazra (IL)

( * ) Notice: Subject to any disclaimer, the term of this patent is extended or adjusted under 35 U.S.C. 154(b) by 0 days.

(21) Appl. No.: 13/128,887

(22) PCT Filed: May 2, 2011

(86) PCT No.: PCT/IB2011/051925
§ 371 (c)(1),
(2), (4) Date: May 12, 2011

(87) PCT Pub. No.: WO2011/138724
PCT Pub. Date: Nov. 10, 2011

(65) Prior Publication Data
US 2013/0043686 A1 Feb. 21, 2013

Related U.S. Application Data

(60) Provisional application No. 61/330,358, filed on May 2, 2010.

(51) Int. Cl.
*F03D 9/00* (2006.01)
*H02P 9/04* (2006.01)

(52) U.S. Cl.
USPC .............................. 290/55; 290/44; 290/1 C

(58) Field of Classification Search
USPC ............................................ 290/1 C, 44, 55
See application file for complete search history.

(56) References Cited

U.S. PATENT DOCUMENTS

| | | | | |
|---|---|---|---|---|
| 4,232,570 A | * | 11/1980 | Gibson | 477/68 |
| 4,774,855 A | * | 10/1988 | Murrell et al. | 475/31 |
| 5,083,039 A | * | 1/1992 | Richardson et al. | 290/44 |
| 7,656,055 B2 | | 2/2010 | Torres | |
| 7,675,211 B2 | | 3/2010 | Dimascio | |
| 7,843,079 B2 | * | 11/2010 | Tseng et al. | 290/45 |
| 7,936,078 B2 | * | 5/2011 | Pavlak | 290/44 |
| 8,203,229 B2 | * | 6/2012 | Stone | 290/55 |
| 8,206,262 B2 | * | 6/2012 | Hehenberger | 477/37 |
| 8,545,360 B2 | * | 10/2013 | Hicks et al. | 475/220 |
| 2005/0233846 A1 | | 10/2005 | Green | |
| 2009/0118043 A1 | * | 5/2009 | Eitan et al. | 474/56 |
| 2010/0137092 A1 | * | 6/2010 | Weichbold et al. | 475/31 |
| 2011/0226077 A1 | * | 9/2011 | Eitan et al. | 74/457 |
| 2011/0252909 A1 | * | 10/2011 | Naveh et al. | 74/439 |
| 2013/0134709 A1 | * | 5/2013 | Eitan et al. | 290/44 |

FOREIGN PATENT DOCUMENTS

WO    WO2010038210    4/2010

* cited by examiner

*Primary Examiner* — Nicholas Ponomarenko
(74) *Attorney, Agent, or Firm* — Mark M. Friedman

(57) ABSTRACT

A wind turbine includes a rotor shaft having thereon rotor blades exposed to wind energy, a first stage gear set on the rotor shaft, a discretely variable ratio gear set coupled to the first stage gear output shaft and having a gear set output shaft, a differential on the gear set output shaft having a differential control shaft facilitating changing the gear box ratio by whole numbers of gear teeth, and a generator operating at a constant frequency coupled to an electric grid operating at the constant frequency. The wind turbine may take a variable speed input of the gear box to create a fixed speed output fed to the generator operating at constant frequency and coupled directly to the power grid without power electronics. Existing wind turbines whether fixed speed fixed pitch or variable speed variable pitch can be retrofitted with the gear box of the present invention.

39 Claims, 18 Drawing Sheets

WIND TURBINE WITH DISCRETELY VARIABLE DIAMETER GEAR BOX

PRIORITY CLAIM

This is a national phase of PCT/IB2011/051924, filed May 2, 2011, which claims priority of U.S. provisional patent application No. 61/330,358, filed May 2, 2010, entitled "Wind Turbine Control System".

FIELD AND BACKGROUND OF THE INVENTION

The present invention relates to apparatuses and methods for wind turbines, and, more particularly to the use of discretely variable ratio gear boxes in wind turbines.

Older wind turbines are of the fixed speed and fixed pitch variety. Their efficiency is never optimized because wind speeds vary and wind input varies. Newer wind turbines are of the variable speed and variable pitch variety. They have a variable output from the gear box which creates a variable frequency and voltage from the generator. Then, in order to be coupled directly to the constant frequency and voltage of the electric grid, these wind turbines employ power electronics, i.e. a converter, to convert the variable frequency and voltage of the generator to the constant frequency and voltage of the electric grid. This power electronics is (i) very expensive, (ii) of heavy weight, (iii) unreliable and (iv) creates additional losses. There is a compelling need to have an apparatus and method that will improve the reliability and energy efficiency of wind turbines while providing wind turbines at the exact conditions demanded by electric grids and at reasonable cost.

SUMMARY OF THE PRESENT INVENTION

One aspect of the present invention is a wind turbine, comprising a rotor shaft having thereon rotor blades exposed to wind energy; a first stage gear set on the rotor shaft, the first stage gear having a first stage gear set output shaft; a discretely variable ratio gear set coupled to the first stage gear output shaft and having a gear set output shaft; a differential on the gear set output shaft, the differential having a differential output shaft and a differential control shaft, the differential control shaft facilitating changing the gear box ratio; and a generator operating at a constant frequency and coupled to an electric grid that operates at the constant frequency A further aspect of the present invention is directed to a method of harnessing wind energy to operate an electric power grid by means of a wind turbine, comprising converting wind energy from wind striking rotor blades to mechanical energy of a rotating rotor shaft that the rotor blades are attached to, the rotor blades and rotor shaft having variable rotational speeds; transferring the variable rotational speed of the rotor shaft to a variable rotational speed of a gear box input shaft; converting the variable rotational speed of the gear box input shaft to a fixed rotational speed of a gear set output shaft by varying a diameter of a gear wheel in the gear box to create a variable gear ratio having non-continuous discrete magnitudes, the variable gear ratio reflecting the variable rotational speed of the rotor blades; and transmitting the fixed rotational speed of the gear set output shaft to a generator operating at constant frequency, the generator coupled directly to an electric power grid.

A still further aspect of the present invention is a wind turbine, comprising a rotor shaft having thereon rotor blades exposed to wind energy from varying wind speeds; a gear box including a discretely variable ratio gear set, the gear box receiving varying rotational energy from a varying rotational speed of the rotor shaft, the discretely variable ratio gear set having a fixed speed output and including a discretely variable diameter gear; and a generator receiving fixed speed output from the gear box, the generator operating at constant frequency and coupled to an electric power grid operating at the constant frequency.

A yet still further aspect of the present invention is directed to an apparatus for wind turbines having a rotor shaft and rotor blades and having a generator connected to an electric power grid, the apparatus comprising a discretely variable ratio gear set of a gear box receiving varying rotational energy from a varying rotational speed of the rotor shaft, the discretely variable diameter gear box having a fixed speed output and including a gear wheel whose diameter can be varied, the discretely variable diameter gear box having a gear set output shaft; a differential coupled to an output shaft of the discretely variable ratio gear set, the differential having a differential output shaft and a differential control shaft, the differential control shaft facilitating shifting of diameters of a gear wheel in the discretely variable ratio gear set, the gear box capable of being utilized in both fixed pitch and variable pitch turbines.

A further aspect of the present invention is a method of retrofitting a wind turbine coupled to a power grid through power electronics, the wind turbine having a fixed ratio gear box, the method comprising removing the power electronics between the generator and the power grid; connecting the generator to the power grid; and replacing the fixed ratio gear box with a discretely variable ratio gear box that receives varying rotational energy from a varying rotational speed of the rotor shaft and that has a fixed speed output.

A still further aspect of the present invention is directed to a method of retrofitting a fixed speed fixed pitch wind turbine that has a generator operating at a constant frequency, the generator coupled directly to a power grid that operates at the constant frequency, the method comprising replacing the fixed ratio gear box situated between a rotor shaft and the generator with a discretely variable ratio gear box, the discretely variable ratio gear box receiving varying rotational energy from a varying rotational speed of the rotor shaft and having a fixed speed output that is transferred to the generator.

A yet still further aspect of the present invention is a method of gear shifting in a wind turbine, comprising coupling a differential to a gear set output shaft of a gear box of the wind turbine, the differential having a differential output shaft connected to a generator and having a differential control shaft; and as rotor speed increases from increased wind energy, in a first step accelerating a rotation of the differential control shaft in a direction consistent with increased rotor speed while maintaining fixed a diameter of a gear wheel in the gear box and in a second step shifting a diameter of a gear wheel in the gear box upward by a gear tooth while slowing the differential output shaft down to zero.

A yet still further aspect of the present invention is a method of limiting a power of a stall controlled wind turbine having rotor blades and having a generator coupled to an electric power grid, the method comprising replacing the fixed ratio gear box situated between a rotor shaft and the generator with a discretely variable ratio gear box; and controlling a degree to which the rotor blades stall without varying a pitch of the rotor blades by using the discretely variable ratio gear box to vary a speed of the rotor blades, the discretely variable ratio gear box receiving varying rotational energy from a varying rotational speed of the rotor shaft and outputting a fixed speed.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF THE INVENTION

Figure 1:
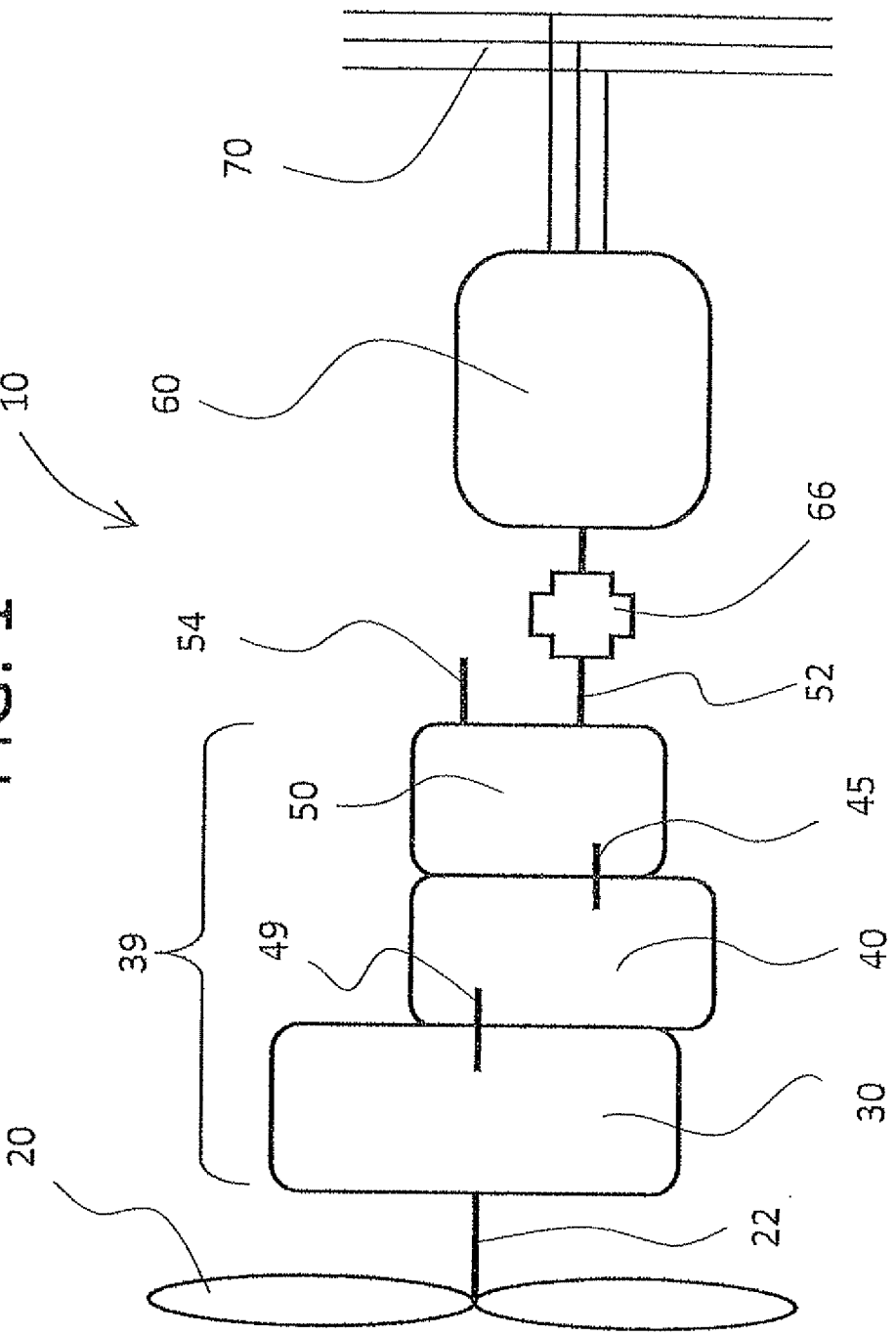
FIG. 1 is a schematic showing a side view of a wind turbine in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a wind turbine with a discretely variable ratio gear box which is connected to a rotor shaft. The gear box may vary a diameter of a gear wheel by whole numbers of gear teeth in response to changes in wind speed on the rotor blades. Typically, the diameter is shifted in increments of one gear tooth at a time. For example, the discretely variable diameter gear may include two tooth sequences that may open and close together to change diameter in a manner where the gap of one tooth sequence does not overlap with a gap of the second tooth sequence. A diameter changer may vary a degree of peripheral coextension between the first and second tooth sequence, which may be positioned around the same axle. A variable effective number of teeth may be provided in the gear of the gear set while allowing toothed engagement around the entire periphery of the effective cylindrical gear wheel in any diameter that the gear of the gear set is in. A differential may be used to smoothen the diameter shifting in the second stage gear set, for example by reversely rotating a differential control shaft while the rotor speed increases and only afterward shifting the gear ratio. The wind turbine may take a variable speed input of the gear box to create a fixed speed output that is fed to a generator operating at constant frequency and coupled directly to a power grid without power electronics. Existing wind turbines whether fixed speed fixed pitch or variable speed variable pitch can be retrofitted with the gear box of the present invention.

In contrast to the prior art variable speed variable pitch wind turbines, in which a variable speed output from the fixed-speed gearbox was transmitted to a variable frequency generator that was coupled to the power grid using power electronics, the wind turbine of the present invention may avoid the use of power electronics altogether. This avoids the expense and heavy weight of power electronics and renders the turbine more reliable and energy efficient. In contrast to prior art fixed speed fixed pitch wind turbines in which the efficiency of the turbine is never optimized due to wind speed variability, the wind turbine of the present invention may be optimized with respect to energy efficiency. In further contrast to variable speed variable pitch wind turbines in which the variability in diameter in the gear box is continuous, which results in a variable output frequency for the generator, the wind turbine of the present invention may use a discretely variable diameter gear box that may be able to produce a fixed speed output from a variable speed input. Accordingly, a constant speed generator can be used and this can be coupled directly to a electric power grid without the need for power electronics. In further contrast to prior art gear boxes, which cannot be placed into both fixed speed fixed pitch wind turbines as well as variable speed variable pitch wind turbines, the discretely variable diameter gear box of the present invention may be retrofitted into both of these kinds of wind turbines, as described in the methods of the present invention relating to retrofitting. In further contrast to the prior art, in which either classical automotive gearboxes with gear wheels and teeth are not used or classical gears that are used cannot shift gears under full load without a clutch disengagement, the wind turbine of the present invention uses classical gears that can shift gears under full load without any clutch disengagement. In still further contrast to the prior art, in which the efficiency of the wind turbine cannot be optimized either because a fixed speed gear box cannot handle the variability in the wind speed or because a variable ratio gear box cannot avoid the use of power electronics, the wind turbine of the present invention may be able to maximize energy efficiency by having the benefits of variable diameter gear box without the drawbacks. In contrast to the prior art wind turbines, in which power may be limited by either stall control or pitch control, the gear box of the present invention may be structured to fit into wind turbines that limit power through stall control and into wind turbines that limit power through pitch control. In still further contrast to the prior art wind turbines, the present invention may provide, in its gear box, a variable effective number of gear ratios while allowing toothed engagement around the entire periphery of the effective cylindrical gear wheel for any diameter that the gear wheel of the gear box is in. This may allow the gear box used in the wind turbine of the present invention to transmit high torque at high efficiency. This may also provide greater power for the discrete variable ratio gear box of the present invention over the continuous variable transmission (CVT) gear box of the prior art which in rare cases may be applied to wind turbines. In further contrast to the prior art fixed speed fixed pitch wind turbines that use stall control to control and set an upper limit on the power of the wind turbine, and this fails to optimize energy efficiency and power, the present invention regulates the amount of stall by varying the speed of the rotor blades while maintaining a fixed pitch in order to optimize energy efficiency and maximize power.

The principles and operation of a method and system for a wind turbine with a discretely variable diameter gear box according to the present invention may be better understood with reference to the drawings and the accompanying description.

Figure 2:
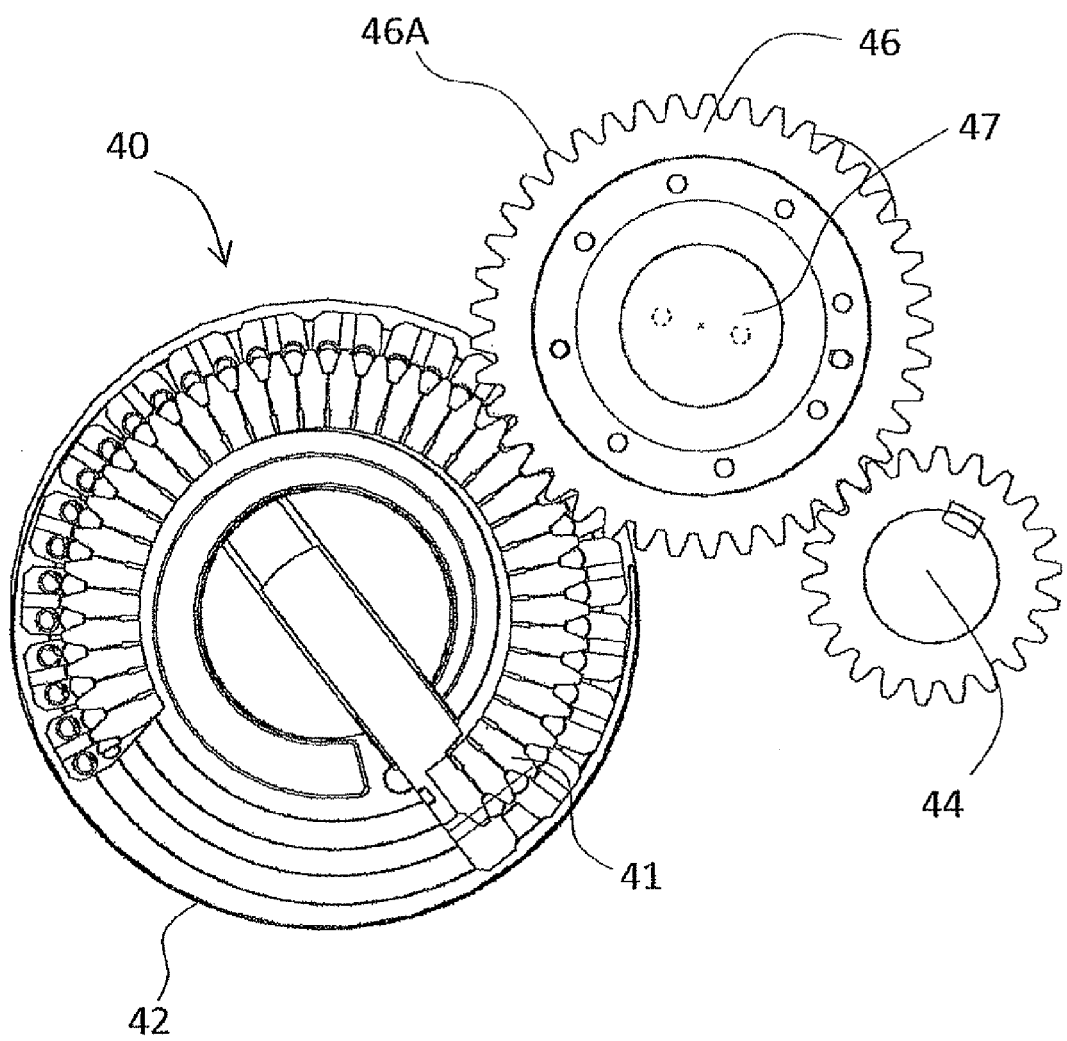
FIG. 2 is a side plan view of the gears of the discrete variable diameter gear box representing a second stage of the gears of a wind turbine in accordance with one embodiment of the present invention.
Figure 2A:
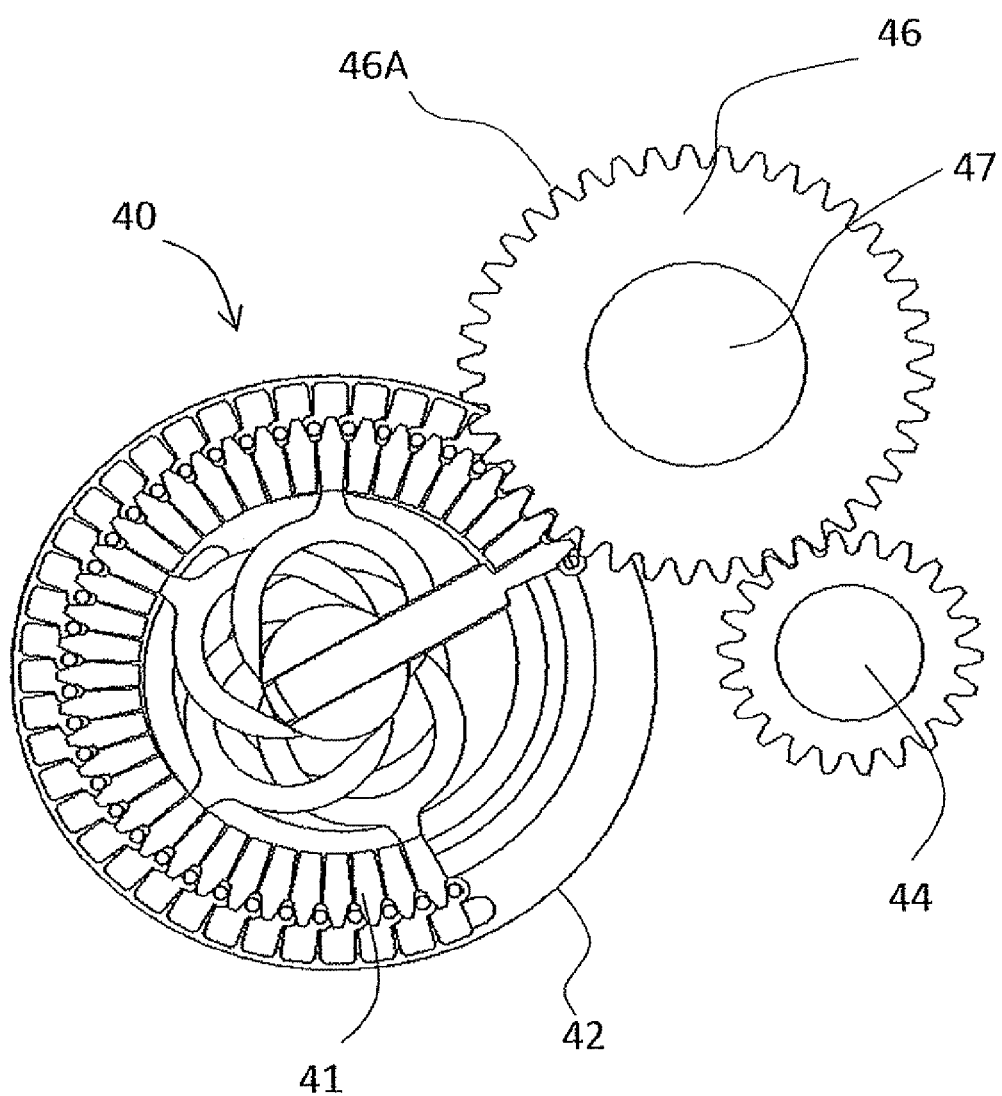
FIG. 2A is a side plan view of the gears of the discrete variable diameter gear box similar to FIG. 2A in accordance with a further preferred embodiment of the present invention.

As seen in FIG. 1, a wind turbine 10 may comprise a rotor shaft 22 having thereon rotor blades 20 exposed to wind energy. As shown in FIG. 2, wind turbine 10 may also have a first stage gear set 30 on rotor shaft 22 or coupled to rotor shaft 22. First stage gear set 30 may be a planetary gear set and may have a stationary ring. First stage gear set 30 may have a set of teeth (not shown) on a first stage gear wheel (not shown) and may include a first stage gear input shaft (not shown) coupled to rotor shaft 22 and a first stage gear output shaft 49 which may double as (or be coupled to) gear box input shaft 49 of the second stage gear set 40.

As seen from FIG. 2, wind turbine 10 may include a second stage gear set 40 that may comprise a discretely variable diameter gear set 40 that may have a tooth sequence 41 or a set of teeth 41 on a variable gear wheel 42 (which may also be called a variable gear 42 or a discretely variable gear 42), the set of teeth 41 being mechanically interlinked to a set of idler teeth 46A of idler gear 46. Tooth sequence 41 may be of a constant pitch. Gear set 40 may be the second stage of gear box 39 (also called discretely variable ratio gear box 39). In addition to variable gear 42, second stage gear set 40 may also include a fixed pinion gear 44 whose shaft 45 may be the gear set output shaft 45 (also called the "second stage gear set output shaft" 45) and an idler gear 46 whose axle 47 is not connected to power. When the tooth sequence or tooth sequences of variable gear wheel 42 open (as seen for example in FIG. 6 which reflects numerous diameter shifts) in order to change diameter, an actuator (not shown) may cause idler gear 46 to move around the fixed pinion gear 44 to adjust to the change in diameter of variable gear 42. Fixed pinion gear 44 may have an output shaft 45 that is the second stage gear set output shaft 45. Second stage gear set 40 may have a gear box input shaft 49 that may receive rotational energy from rotor shaft 22 through first stage gear set 30.

The gear set 40 is referred to herein as "discretely variable" in diameter since the diameter of the variable gear 42 varies in diameter by discrete whole numbers of teeth of the tooth sequence 41 around the periphery of the variable gear 42. In may be appreciated, however, that during the very small time span in which the actual shifting of diameter occurs, the change in diameter occurs continuously rather than discretely. Other than during the actual shifting, the magnitude of the diameter of the variable gear 42 may be measured in discrete whole numbers measuring an effective number of gear teeth.

Figure 3:
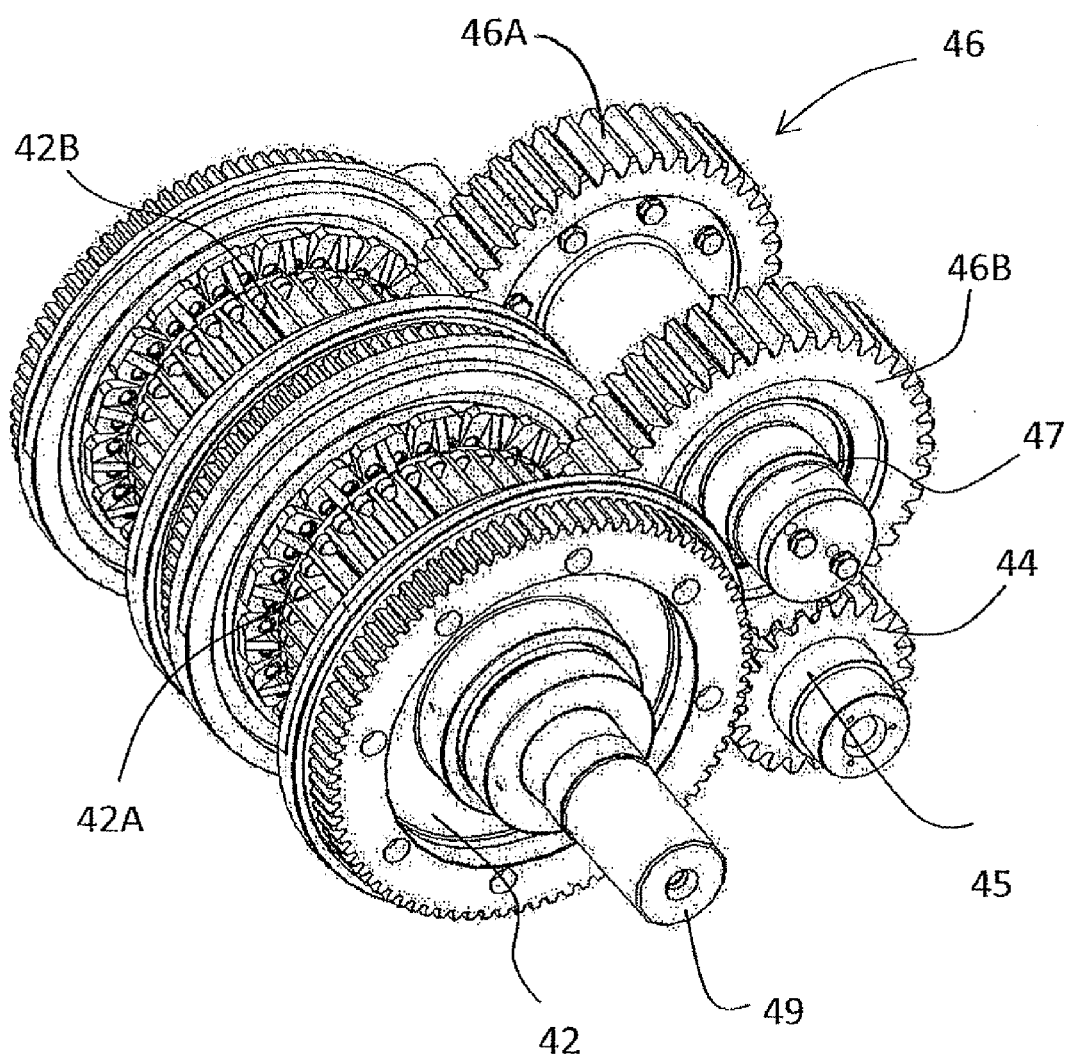
FIG. 3 is an isometric view from the side of the gears of the discrete variable diameter gear box representing a second stage of the gears of a wind turbine in accordance with one embodiment of the present invention.
Figure 3A:
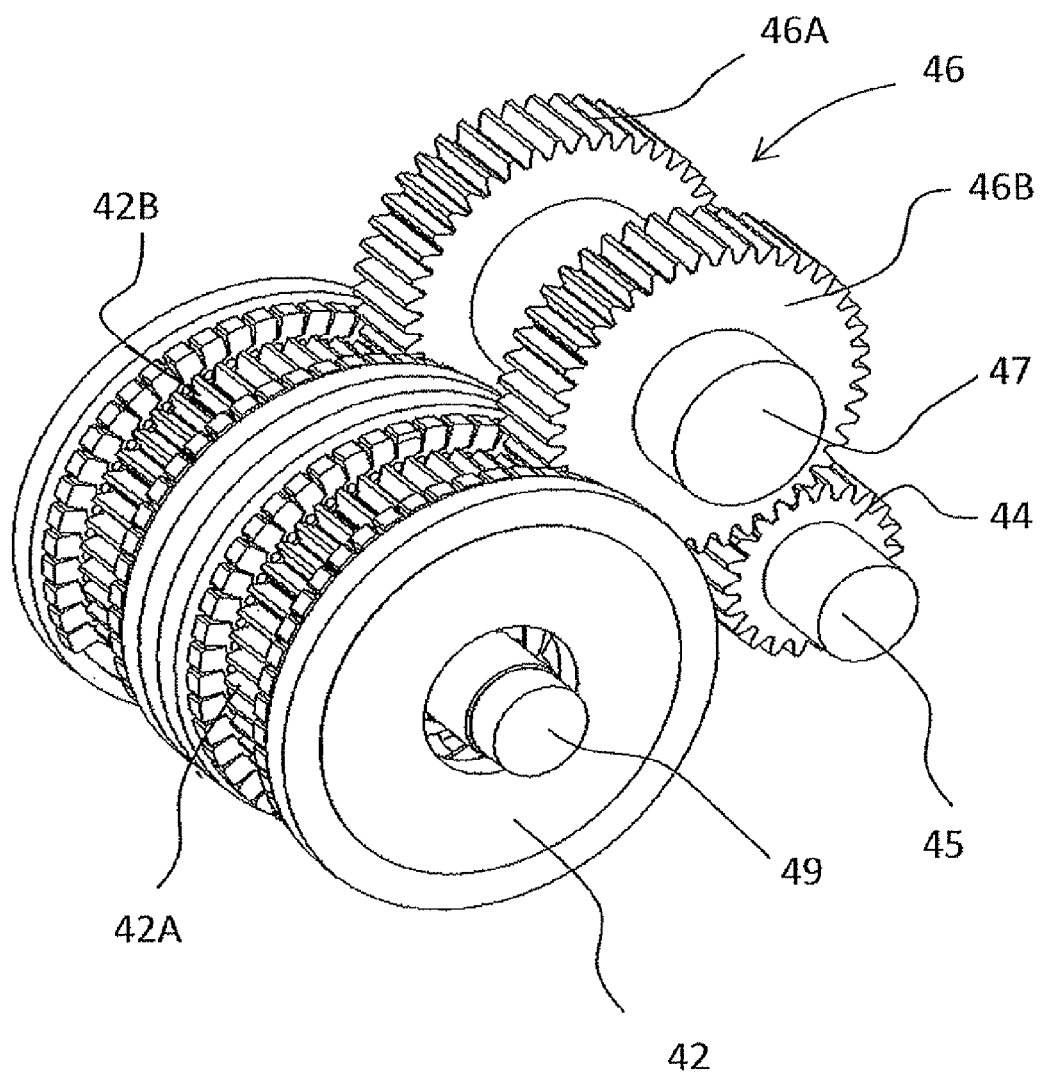
FIG. 3A is an isometric view from the side of the gears of the discrete variable diameter gear box similar to FIG. 3 in accordance with the further preferred embodiment of the present invention shown in FIG. 2A.

FIG. 3 shows an arrangement with a gear 42 having two coaxial tooth sequences 42A, 42B, a pinion gear 44 having one or two collinear gears and an idler gear 46 having two collinear gears 46A, 46B. However, other arrangements of gear set 40 are possible consistent with the present invention that may create a discretely variable ratio stage gear set 40. For example, in another implementation of the discretely variable gear ratio concept of the present invention, pinion 44 may also be a discretely variable gear with a structure similar to wheel 42. In addition, in a further implementation, instead of a coaxial arrangement, gear set 40 may include a gear wheel 42 with a single tooth sequence, a plurality of idler gears and a plurality of pinion gears.

As seen in FIG. 1, because gear box 40 is not a continuously variable diameter gear box but is a discretely variable diameter gear box 40, turbine 10 may include a differential 50 on the variable ratio gear set output shaft 45 both to smoothen the shifts in diameter of the discretely variable diameter gear box and to eliminate torque spikes. Differential 50 may be a planetary differential and may have a differential output shaft 52 and a differential control shaft 54. Differential control shaft 54 may facilitate shifting of the gear ratio in gear box 39 ("sometimes called the gear box ratio"). Besides smoothing out the discrete diameter changes of the gears in gear set 40 of gear box 39, differential 50 may also reduce or eliminate torque spikes in gear box 39. Note that differential 50 may also have a differential input shaft that may double as, or may be coupled to, second stage gear set output shaft 45.

Figure 14:
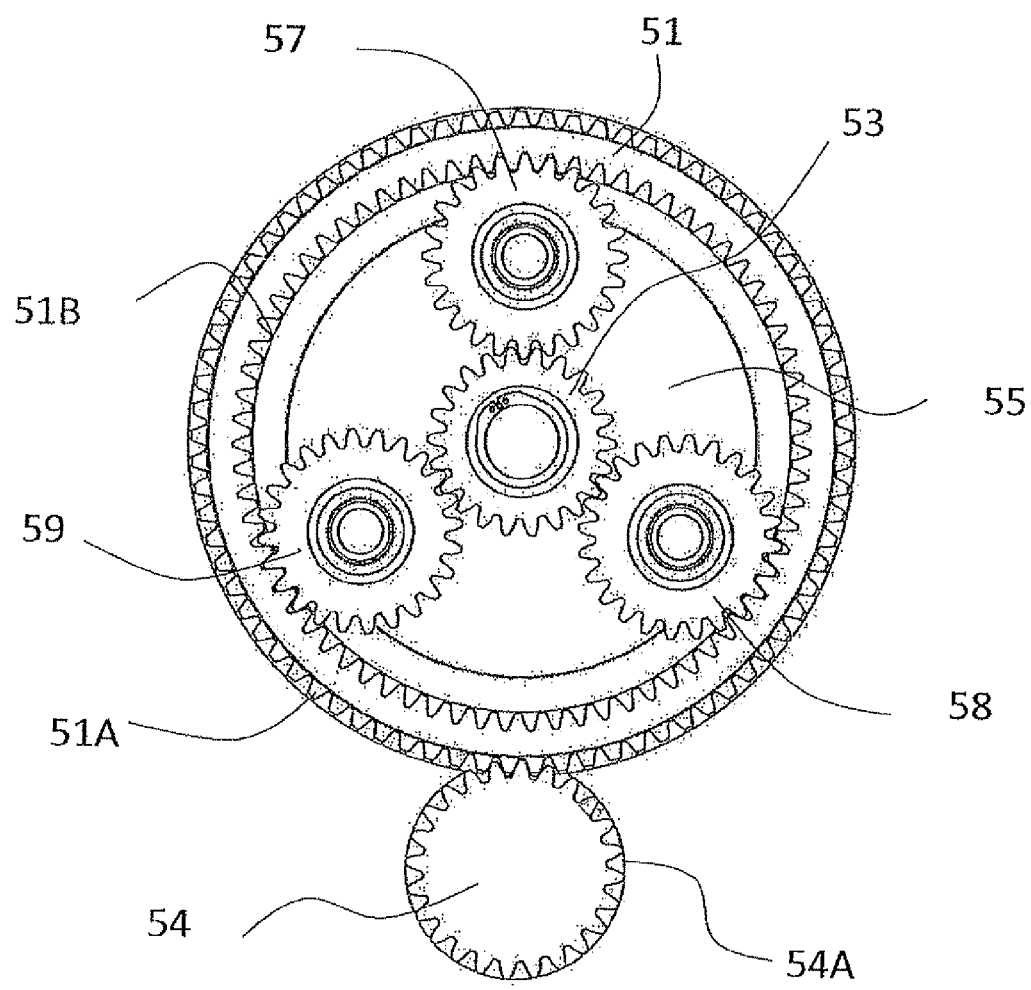
FIG. 14 is a side plan view of a planetary differential, in accordance with one embodiment of the present invention.

FIG. 14 shows a differential gear set in a planetary configuration. In this planetary configuration, differential control shaft 54 may be the shaft of ring pinion 54A. Ring pinion 54A may be enmeshed with the external teeth 51A of ring 51. Sun gear 53 may be affixed on the differential output shaft 52. The second stage gear output shaft 45 may be the shaft of the planet carrier 55, which may be a plate to which planet gears 57, 58, 59 may be affixed. Planet gears 57, 58, 59 may be enmeshed with the internal teeth 51B of ring 51.

The basic planetary formulas for the third stage planetary differential is:

$$\omega_{Planet} * (R_{Ring} + R_{Sun}) = \omega_{Sun} * R_{Sun} + \omega_{ring} * R_{Ring}$$

The formula with the external pinion is:

$$\omega_{Ring} = \omega_{External\ Pinion} * \left( \frac{R_{External\ Pinion}}{R_{Ring\ External}} \right)$$

$$\omega_{Planet} * (R_{RI} + R_{Sun}) = \omega_{Sun} * R_{Sun} + \omega_{EP} * \left( \frac{R_{RI} * R_{EP}}{R_{RE}} \right)$$

As seen from FIG. 1, wind turbine 10 may include a constant frequency generator 60 coupled to the differential output shaft 52. Since the output of the gear box 40 and differential 50 is a fixed rotational speed, generator 60 may have a constant speed that may allow the generator to produce power at a constant frequency and be connected to an electric power grid 70 without a rectifier or power converter. Generator 60 may be induction or Synchronous, as well as Permanent Magnet Generator (PMG), or Hybrid PMG. Accordingly, as shown in FIG. 1, generator 60 may be connected to power grid 70 through flexible coupling 66. In Europe, a power grid frequency is 50 Hz, which would require that a generator connected to such a power grid be set to operate at a constant frequency of 50 Hz. Generally, this frequency may translate to a rotational speed of 1500 rpm. In North America the power grids may operate at frequencies of 60 Hz which may translate to a generator rotational speed of 1800 rpm. Since in the present invention the output of the variable ratio gear box 39 may be a constant frequency, generator 60 may operate at a constant frequency and generator 60 may not need to be converted before being coupled to the electric power grid 70. Therefore, the varying power demands of the electric power grid may be met by wind turbine 10 without the need for power electronics.

Figure 6:
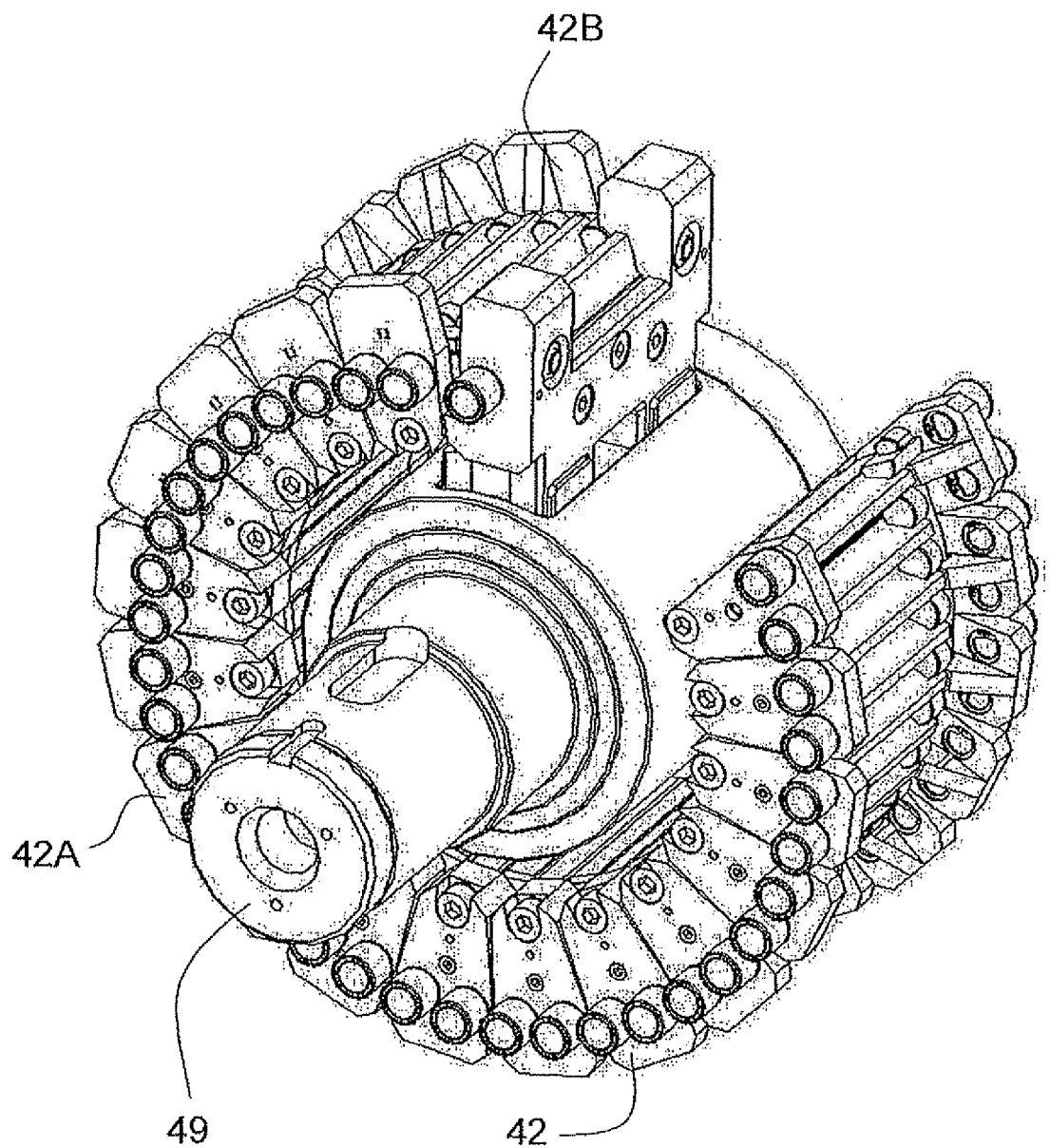
FIG. 6 is a perspective view of a variable diameter gear wheel of a discretely variable ratio gear box, in accordance with one embodiment of the present invention.
Figure 6A:
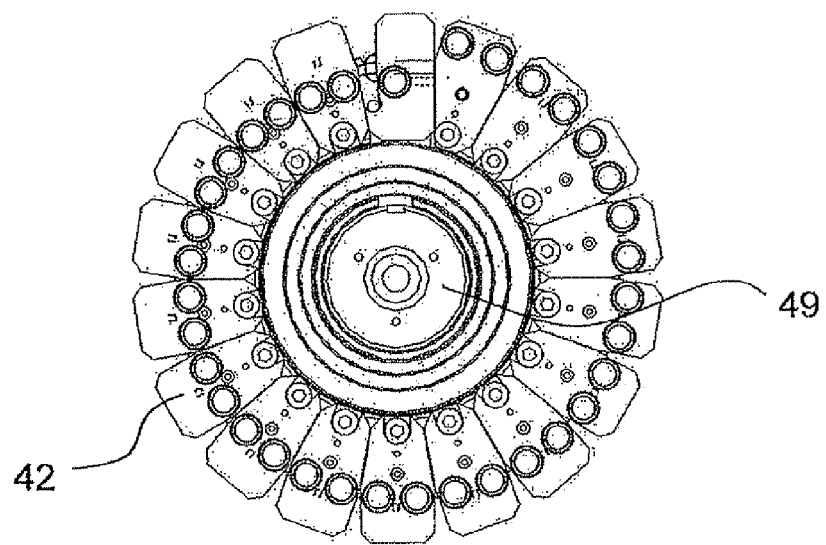
FIG. 6A is a side view of a gear tooth sequence of the variable diameter gear wheel of FIG. 6 fully closed.
Figure 6B:
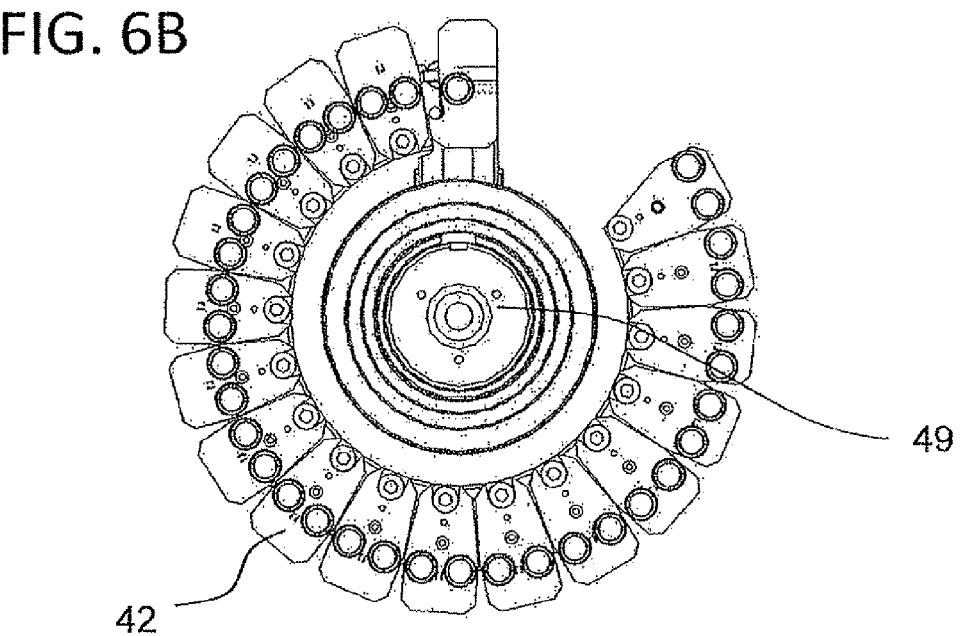
FIG. 6B is a side view of a gear tooth sequence of the variable diameter gear wheel of FIG. 6 similar to FIG. 6A except after diameter shifts have taken place.
Figure 6C:
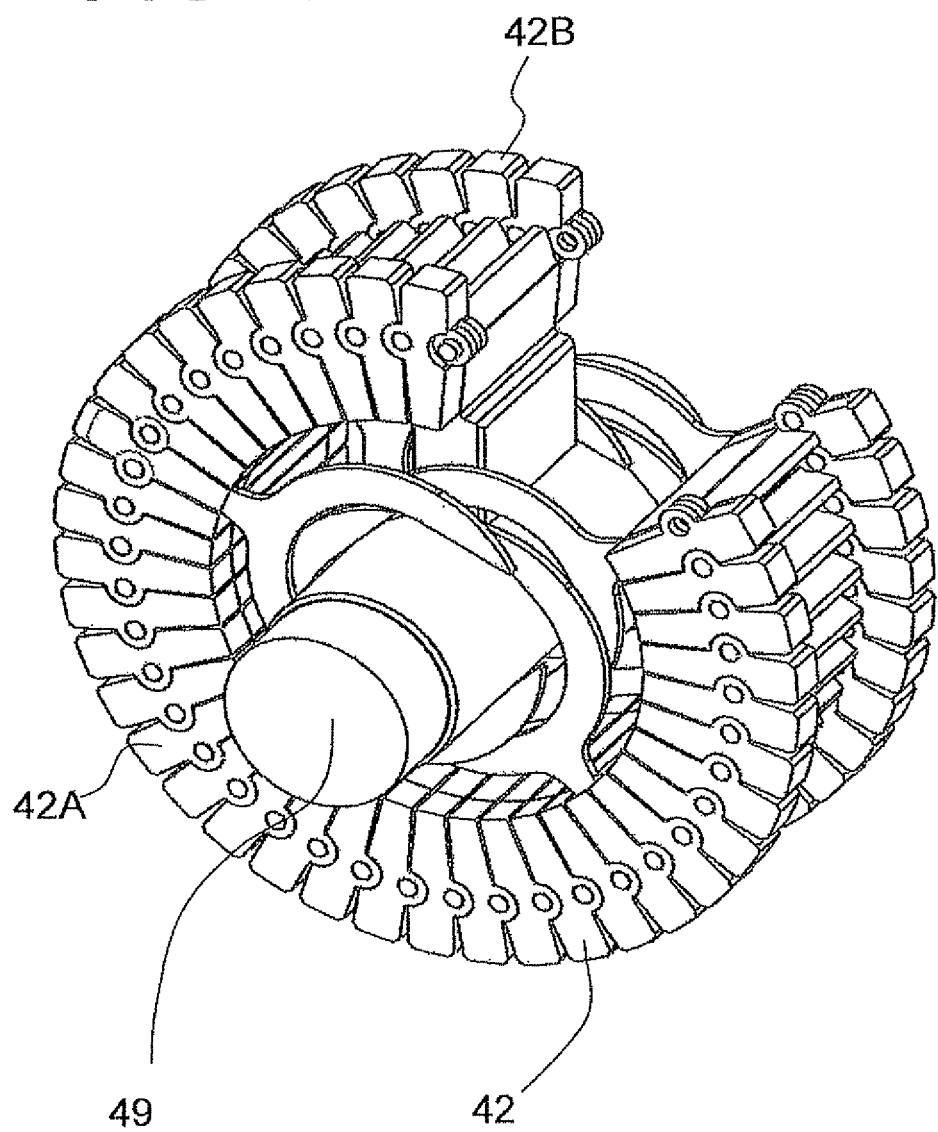
FIG. 6C is a perspective view of a variable diameter gear wheel of a discretely variable ratio gear box, in accordance with the further preferred embodiment of the present invention shown in FIGS. 2A and 3A.
Figure 6D:
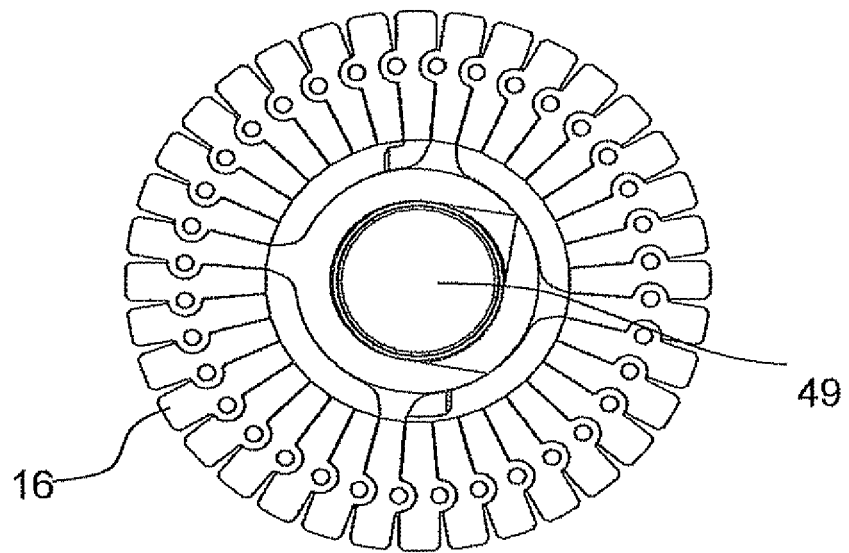
FIG. 6D is a side view of a gear tooth sequence of the variable diameter gear wheel of FIG. 6C fully closed.
Figure 6E:
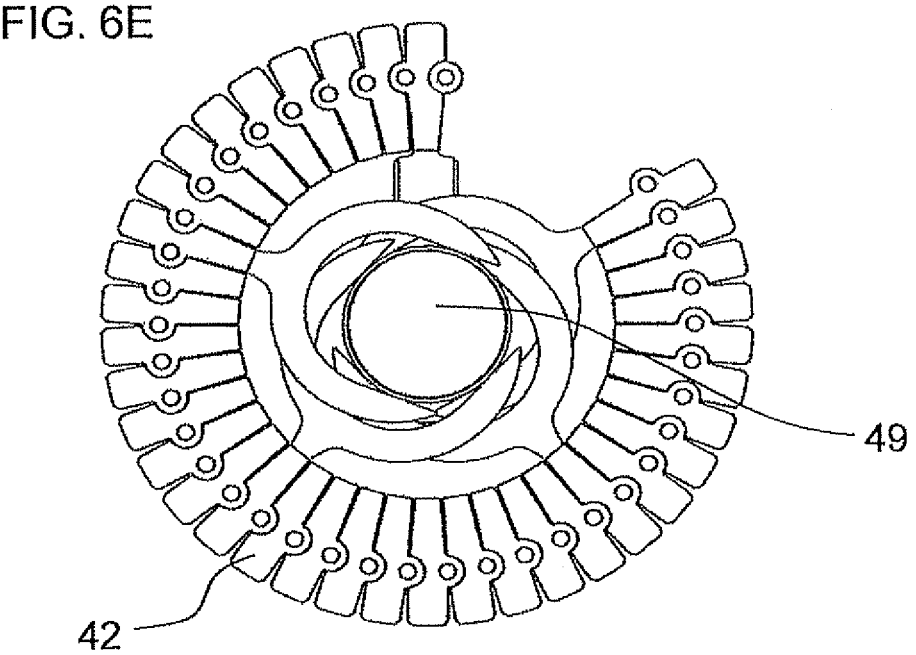
FIG. 6E is a side view of a gear tooth sequence of the variable diameter gear wheel of FIG. 6C similar to FIG. 6D except after diameter shifts have taken place.

As seen from FIG. 3, gear wheel 42 of discretely variable diameter gear set 40 may include two or more sets of gear teeth 42A, 42B (or gear teeth sequences) which may be coaxial, i.e. may be positioned around the same axial. Each gear tooth sequence 42A, 42B may have a set of gear teeth thereon. As shown in FIG. 6, which may depict a different embodiment of gear wheel 42, gear wheel 42 may include two tooth sequences 42A, 42B that may open and close together to change diameter in a manner where the gap of one tooth sequence does not overlap with a gap of the second tooth sequence. This may vary a degree of peripheral coextension between the first and second tooth sequence 42A, 42B, which may be positioned around the same axle. A diameter changer may thereby shift a diameter of a gear wheel 42 in the gear set 40, which is a second stage of gear box 39, by a discrete whole number of gear teeth. Further detailed description of the structure of the discretely variable diameter gear of a second stage gear set used in the present invention is provided in detail in pending U.S. published patent application Ser. No. 12/204,027 by Applicant Nimrod Eitan published on May 7, 2009 under Publication No. US2009-0118043-A1, which Applicant hereby incorporates by reference in its entirety. Other variations of gears or gear sets having a discretely variable diameter changer 43 in accordance with the present invention are described in Applicant's other U.S. patent application Ser. No. 12/596,984 filed Oct. 22, 2009 and U.S. patent application Ser. No. 12/670,644 filed Jan. 26, 2010.

A controller (not shown) may be used to control motors connected to various parts of gear set 40 in order to regulate when to shift the diameter. For example, a shift motor (not shown) may be connected to variable gear 42 and an idler motor (not shown) may be connected to idler gear 46.

Figure 13:
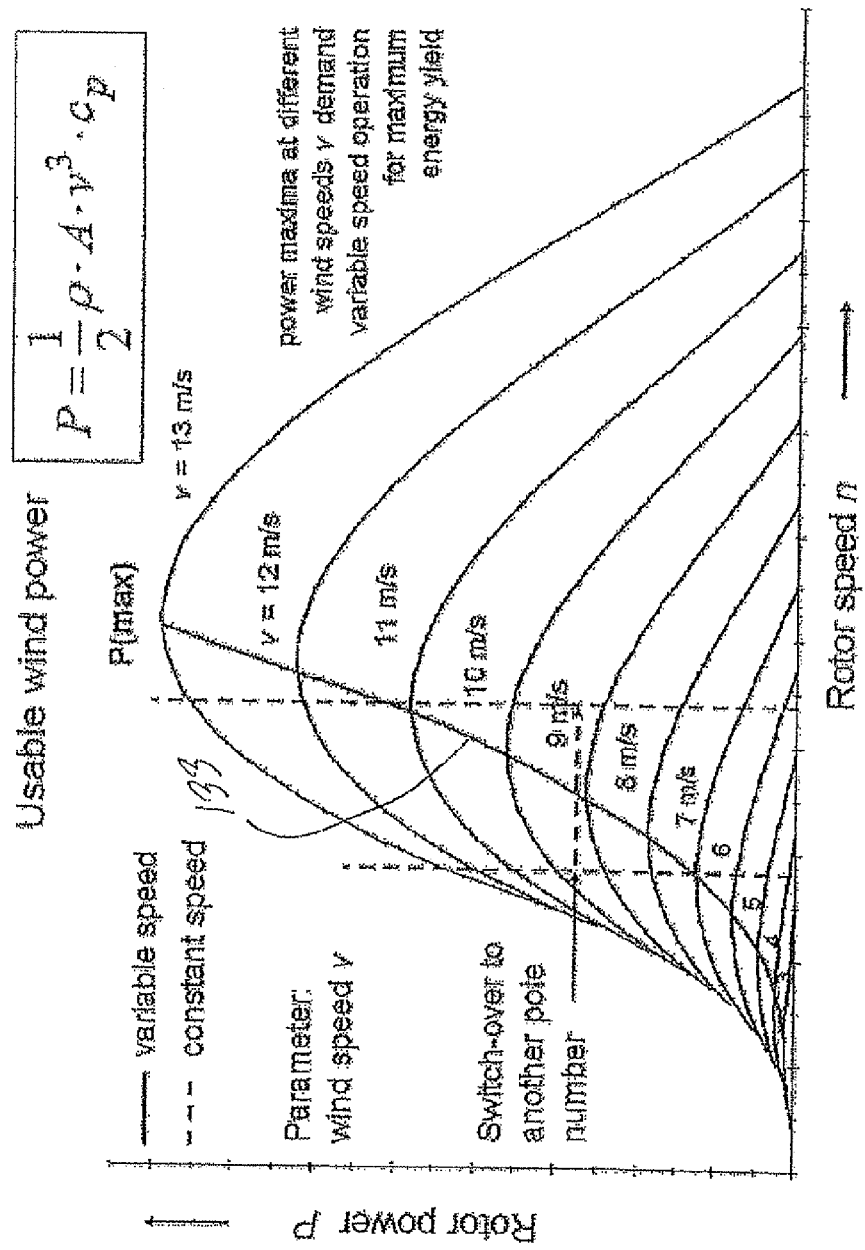
FIG. 13 is a graph showing how a wind turbine in accordance with one embodiment of the present invention extracts more energy from a fixed speed turbine by turning it into a variable speed turbine.

The graph in FIG. 13 shows how the wind turbine 10 of the present invention extracts more energy from a fixed speed turbine by turning it into a variable speed turbine. The power extracted by the turbine from the wind is calculated by the following formula:

$$P = \frac{1}{2}\rho * V^3 * C_p \text{ where}$$

ρ=Air density
A=Rotor's swept area
V=wind speed
Cp=Power coefficient

In stall-controlled turbines, the Cp is at its maximum point only at one wind speed, and at other wind speeds Cp is reduced. The use of variable speed allows the turbine to improve the Cp. The graph in FIG. 13 shows rotor power as a function of rotor speed and shows that for every wind speed, there is one rotor speed which is a maximum point. The use of variable speed allows the turbine to reach these maximum points (the maximum points are connected by the line 133 in FIG. 13).

As a result of the fact that gear set 40 may have a variable effective number of teeth while allowing toothed engagement around the entire periphery of the effective cylindrical gear wheel for any diameter that the gear wheel of the gear box is in, gear set 40 used in wind turbine 10 may be able to transmit high torque at high efficiency. Moreover, discretely variable diameter gear box 39 may be capable of shifting gears under full load without a clutch disengagement or torque discontinuation. Gear set 40 may have approximately twelve to twenty-five gears.

Figure 4:
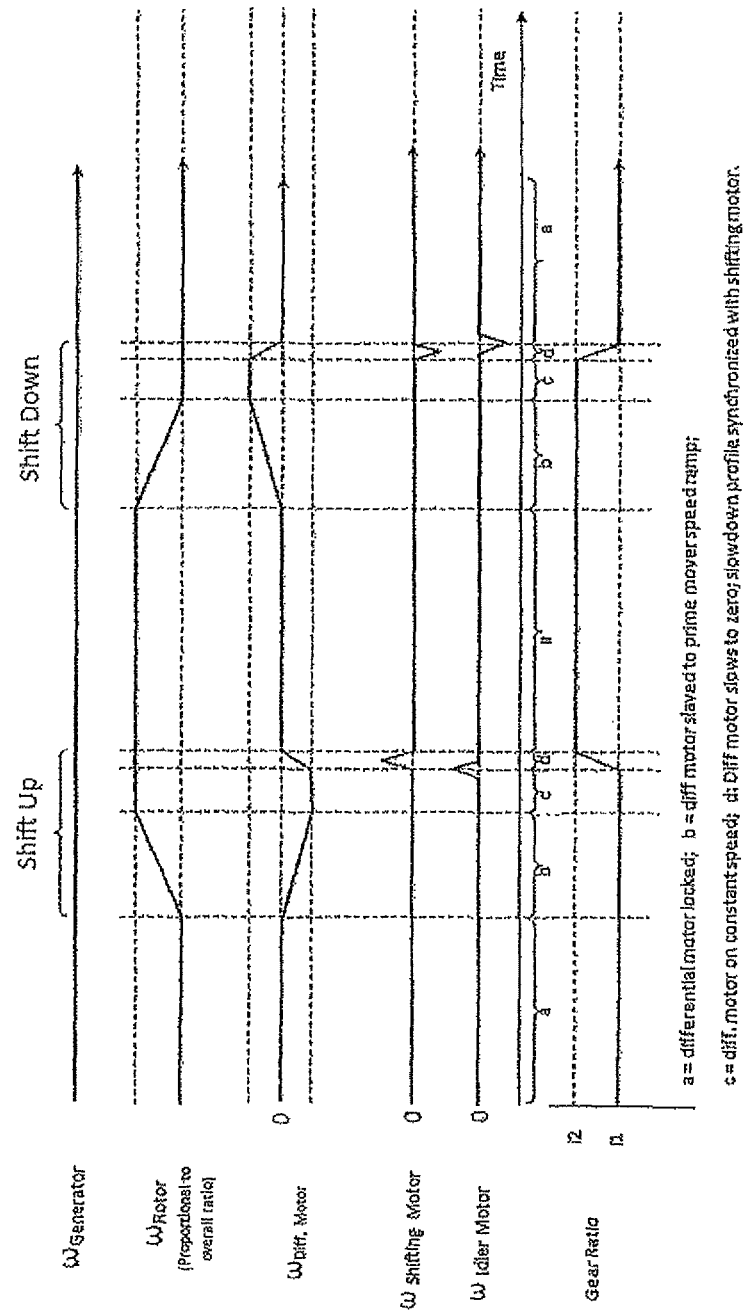
FIG. 4 is a schematic showing a shifting control regime for shifting diameter by a discrete variable diameter gear box in accordance with one embodiment of the present invention.

FIG. 4 shows a gear shifting regimen over time in accordance with one embodiment of the present invention. Initially, as shown in section "a" at the left of the schematic, wind speed is constant and rotor speed is constant. As a result, for example, of a wind gust, section "b" shows that there is a gradual increase in the speed of the rotor and rotor shaft. However the diameter of a gear wheel 42 in gear set 40 of gear box 39 may be held constant and the gear ratio of gear set 40 does not change. Instead, as the rotor speed increases, gear box 39 may accelerate a rotation of the differential control shaft 54 in a direction consistent with increased rotor blade speed. Then, as shown in section "c", differential control shaft 54 may be held at a constant speed in the opposite direction (i.e. a direction opposite to the direction that is consistent with increased rotor blade speed) and the diameter of the gear wheel 42 in gear set 40 is still not adjusted. Finally, in section "d", using a diameter changer engaged to a shifting motor, a diameter of gear wheel 42 of gear set 40 may be shifted upward by one gear tooth. At the same time, the speed of differential output shaft 54 may now be brought down to zero. As can be seen from sections "a", "b" and "c" at the right portion of the schematic of FIG. 5, if wind speeds decrease, the regimen may be reversed. If, however, wind speeds continue to increase further, the same procedure may be used to shift the diameter of gear heel 42 upward by one further discrete mount, such as one gear tooth.

Figure 7:
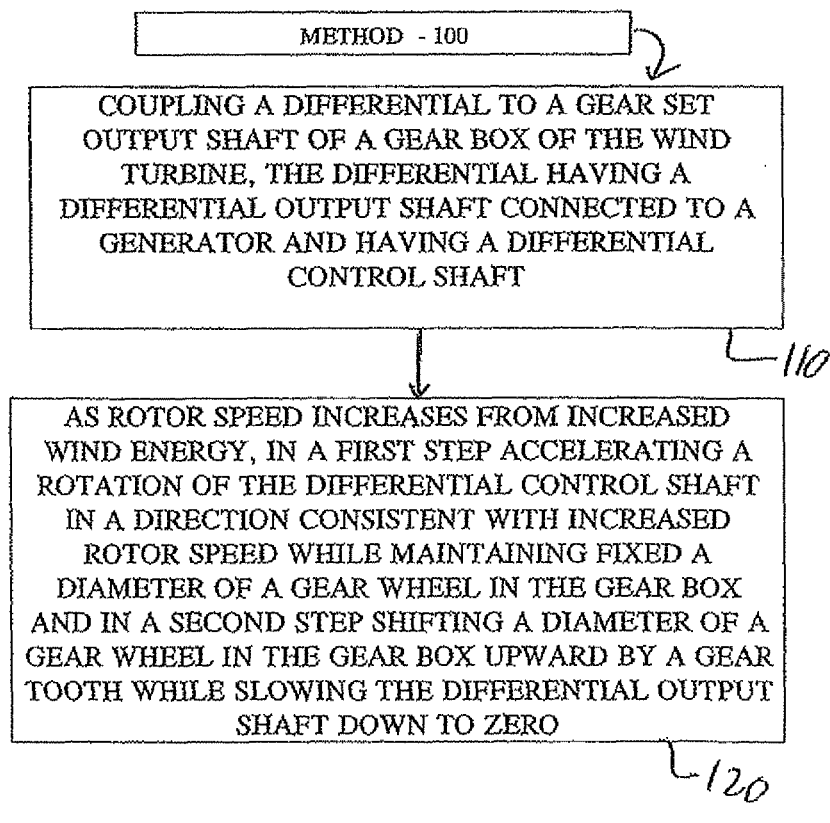
FIG. 7 is a flow chart showing a method in accordance with one embodiment of the present invention.

Accordingly, as shown in FIG. 7, the present invention may be characterized as a method 100 of gear shifting in a wind turbine. Method 100 may have a first step 110 of coupling a differential to a gear set output shaft of a gear box of the wind turbine, the differential having a differential output shaft 52 connected to a generator 60 and having a differential control shaft 54. Method 100 may also have a second step 120 whereby as the rotor speed increases from increased wind energy, in a first step accelerating a rotation of the differential control shaft 54 in a direction consistent with increased rotor speed while maintaining fixed a diameter of a gear wheel in the gear box 40 and in a second step shifting a diameter of a gear wheel of the gear box upward by a gear tooth while slowing the differential control shaft 54 down to zero. Method 100 may also include an intermediate step between the first step and the second step comprising holding the differential control shaft 54 at a constant speed in the direction consistent with increased rotor blade speed while maintaining fixed the diameter of the gear wheel 42 in the gear set 40.

As shown in FIG. 4, when wind speeds decrease the regimen may be reversed. Consequently, method 100 may also have a further step whereby as rotor speed decreases from decreased wind energy, in an initial step accelerating the rotation of the differential control shaft 54 in a direction opposite to the direction that is consistent with increased rotor blade speed while maintaining fixed a diameter of a gear wheel 42 in the gear set 40 of gear box 39 and in a subsequent step shifting a diameter of a gear wheel 42 of the gear set 40 downward by a gear tooth while slowing the differential control shaft 54 down to zero. Furthermore, method 100 may also include a further intermediate downward step between the initial step and the subsequent step comprising holding the differential control shaft 54 at a constant speed in the direction opposite to the direction that is consistent with increased rotor blade speed while maintaining fixed the diameter of the gear wheel in the gear box 40.

Figure 5:
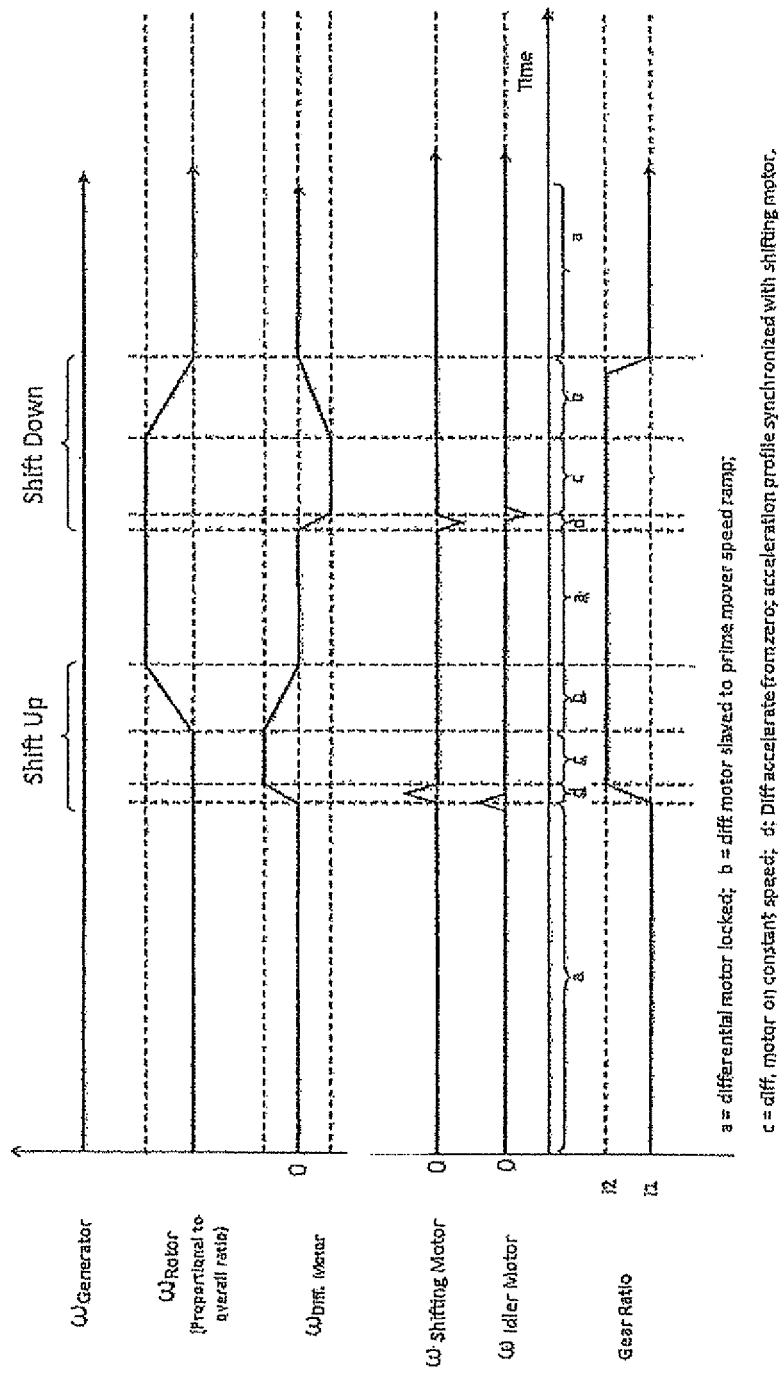
FIG. 5 is a schematic showing a shifting control regime for shifting diameter by a discrete variable diameter gear box in accordance with a further embodiment of the present invention.

FIG. 5 shows an alternative gear shifting regimen over time in accordance with a further embodiment of the present invention. In this case, as the rotor speed increases from increased wind energy, instead of immediately accelerating a rotation of the differential control shaft 54 in a direction consistent with increased rotor blade speed while maintaining fixed a diameter of a gear wheel in the gear box, the step is first preceded by sections "d" and "c" of the regimen shown in FIG. 5 whereby the gear ratio may be increased while the differential control shaft is accelerated (section "d") and then the gear ratio is held constant while the rotational speed of the differential control shaft 54 may be held steady in a direction opposite to the direction that is consistent with increased rotor blade speed.

Figure 8:
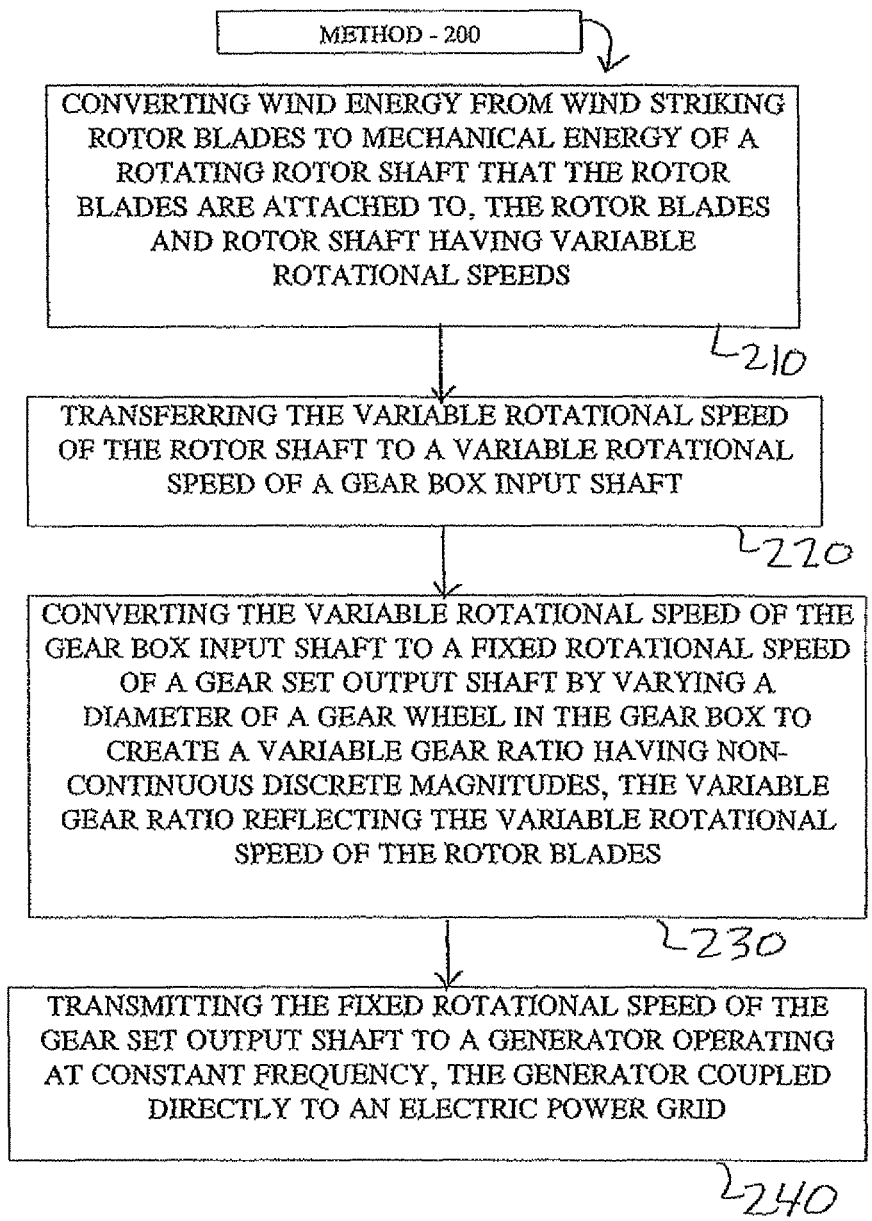
FIG. 8 is a flow chart showing a further method in accordance with a further embodiment of the present invention.

The present invention may further be characterized as a method 200 of harnessing wind energy to operate an electric power grid by means of a wind turbine. As shown by FIG. 8 method 200 may include a step 210 of converting wind energy from wind striking rotor blades to mechanical energy of a rotating rotor shaft that the rotor blades are attached to, the rotor blades and rotor shaft having variable rotational speeds. Method 200 may further include a step 220 of transferring the variable rotational speed of the rotor shaft to a variable rotational speed of a gear box input shaft.

Method 200 may further include a step 230 of converting the variable rotational speed of the gear box input shaft to a fixed rotational speed of a gear set output shaft by shifting a diameter of a gear wheel in the gear box to create a variable gear ratio having non-continuous discrete magnitudes. The gear ratio in gear set 40 of gear box 39 may vary by discrete amounts to reflect the variations in rotational speed of the rotor blades. Step 240 of method 200 may comprise transmitting the fixed rotational speed of the second stage gear set output shaft 45 to a generator that produces constant voltage and frequency. The generator may be coupled directly to an electric power grid without power electronics, i.e. without a power converter.

The discretely variable gear box 40 of the present invention may be used as a part of a new wind turbine or it made be used to retrofit an existing wind turbine to make it more energy efficient and reliable. Regarding use of discretely variable gear box 40 to retrofit existing turbines, it is noted that gear box 40 may function both in a fixed speed fixed pitch turbine as well as in a variable speed variable pitch turbine.

Figure 9:
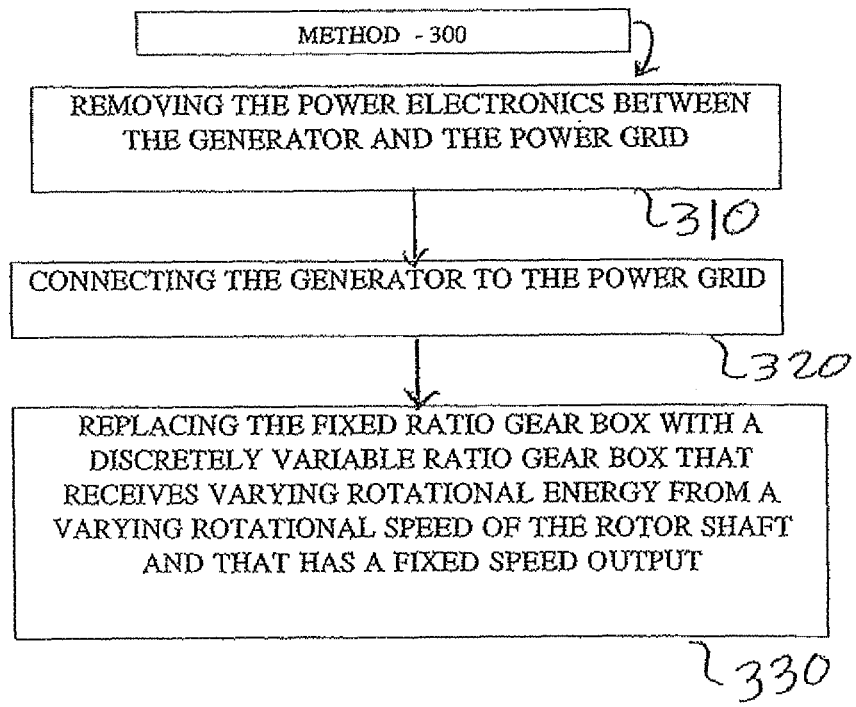
FIG. 9 is a flow chart showing a still further method in accordance with an embodiment of the present invention.

Accordingly, the present invention may be characterized as a method 300 of retrofitting a wind turbine having variable speed output and variable pitch rotor blades and coupled to a power grid through power electronics. The phrase "coupled to a power grid through power electronics" includes both doubly fed converters and fully converted turbines. As shown by FIG. 9, method 300 may include a first step 310 of removing the power electronics (i.e. power converter and rectifier) between the generator 60 and the electric power grid. Method 300 may also include a step 320 of connecting the generator to the power grid directly. A further step 330 of method 300 may comprise replacing the fixed-ratio gear box with a discretely variable ratio gear box 39 including gear set 40 having variable diameter gear 42. The discretely variable ratio gear box 39 would then receive varying rotational energy from a varying rotational speed of the rotor shaft but it may have as output a fixed speed output, thus allowing a generator coupled to it to operate at a constant frequency. Method 300 may also include a further step (not shown) of coupling a differential 50 to gear set 40 so that differential 50 is positioned between the discretely variable ratio gear set 40 and the generator 60. The differential 50 may make the ratio shifting of gear set 40 and of gear box 39 smooth and may reduce or eliminate torque spikes in gear box 39 from the wind gusts and variability in wind speed. Differential 50 may operate as per the shifting regimen described regarding FIG. 4.

Figure 10:
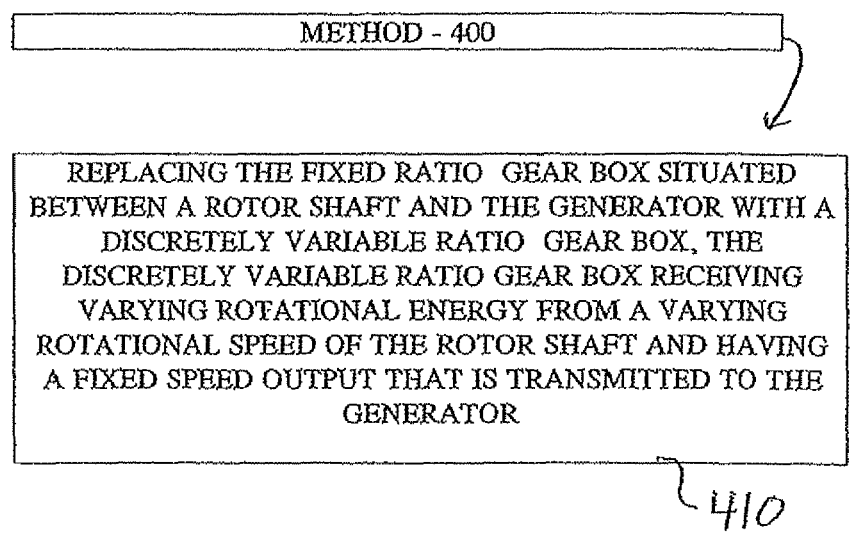
FIG. 10 is a flow chart showing a still further method in accordance with an embodiment of the present invention.

Similarly, and as seen in FIG. 10, the present invention may also be described as a method 400 of retrofitting a fixed speed fixed pitch wind turbine that has a constant speed generator coupled to a power grid. Method 400 may include a step 410 of replacing the fixed speed gear box situated between a rotor shaft and the generator with a discretely variable ratio gear box that receives varying rotational energy from a varying rotational speed of the rotor shaft and that has a fixed speed output that is transmitted to the constant frequency generator. The method 400 may have a further step of coupling the discretely variable ratio gear set to a planetary gear set that is coupled to the rotor shaft.

Figure 11:
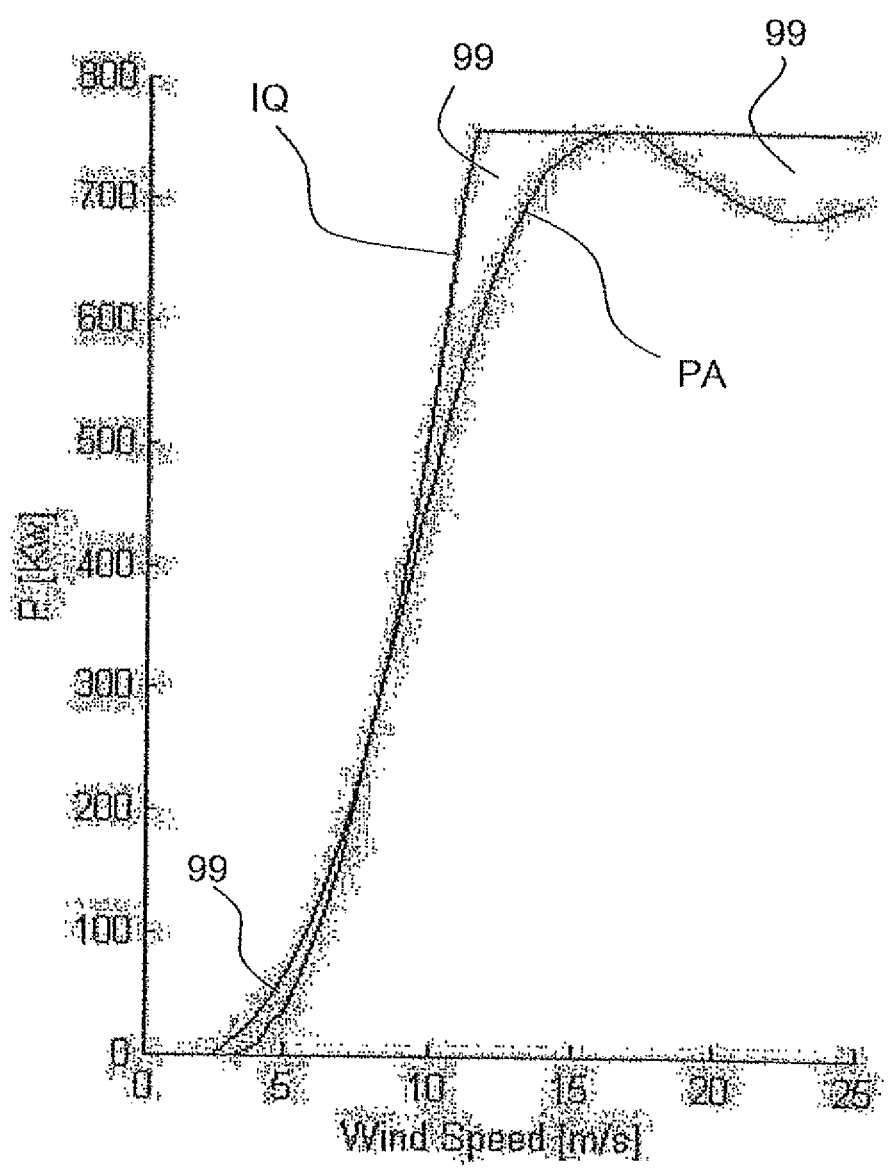
FIG. 11 is a graph showing a power curve of a stall controlled wind turbine adjacent a power curve of a prior art stall controlled wind turbine.
Figure 12:
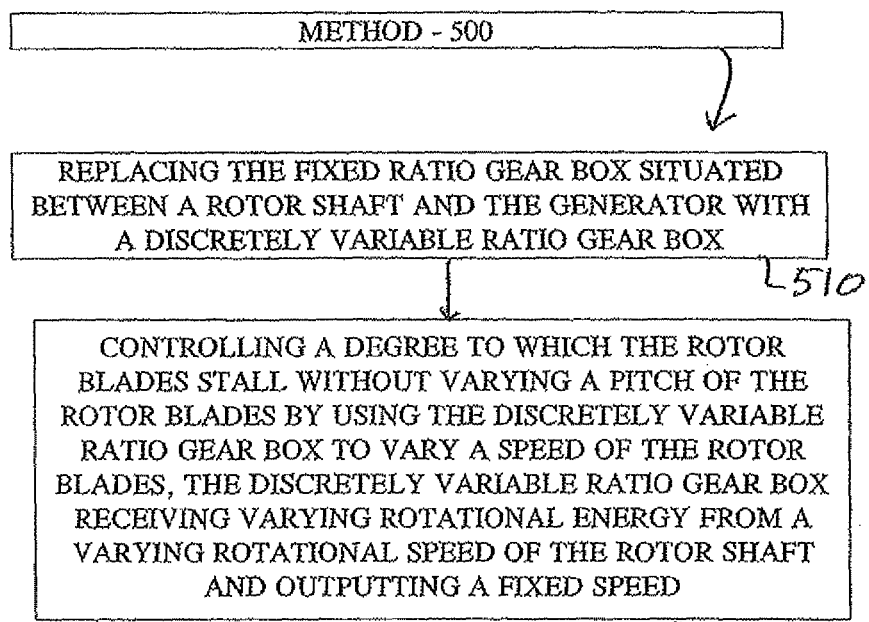
FIG. 12 is a flow chart showing a further method in accordance with an embodiment of the present invention.

It is noted that the fixed speed fixed pitch wind turbines are also called stall controlled turbines because instead of using a variable pitch to limit power, they use stall control. FIG. 11 shows the power curve for a prior art (PA) stall controlled wind turbine and the power curve (IQ) for the wind turbine of the present invention. As shown in FIG. 11, the method of controlling power using stall control results in an area 99 of the power curve that fails to optimize the power of the turbine. Accordingly, as seen from FIG. 12, the present invention may also be described as a method of limiting a power of a stall controlled wind turbine having rotor blades and having a generator coupled to an electric power grid. Method 500 may comprise a step 510 of replacing the fixed ratio gear box situated between a rotor shaft and the generator with a discretely variable ratio gear box. Method 500 may also include a step 520 of controlling a degree to which the rotor blades stall without varying a pitch of the rotor blades by using the discretely variable ratio gear box to vary a speed of the rotor blades. The discretely variable ratio gear box receives varying rotational energy from a varying rotational speed of the rotor shaft and outputs a fixed speed.

Even when there is no intention to shift the diameter of variable diameter gear 42, differential control shaft 54 may be rotated in order to affect the ratio between second stage gear output shaft 45 and differential output shaft 52 of the differential stage (third stage). Rotation of differential control shaft 54 may thereby be used to increase or decreases the speed of the second stage gear output shaft 52, depending on the direction of rotation of differential control shaft 54.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A wind turbine, comprising:
a rotor shaft having thereon rotor blades exposed to wind energy;
a first stage gear set on the rotor shaft, the first stage gear having a first stage gear set output shaft;
a discretely variable ratio gear set coupled to the first stage gear output shaft and having a gear set output shaft;
a differential on the gear set output shaft, the differential having a differential output shaft and a differential control shaft, the differential control shaft facilitating changing the gear box ratio; and
a generator operating at a constant frequency and coupled to an electric grid that operates at the constant frequency.

2. The wind turbine of claim 1, wherein the discretely variable ratio gear set shifts a diameter of a gear wheel in the gear set by a discrete whole number of gear teeth.

3. The wind turbine of claim 1, wherein the discretely variable ratio gear set includes a first tooth sequence of a gear wheel displaced from a second tooth sequence of the gear wheel so as to vary a degree of peripheral coextension between the first and second tooth sequences on the gear wheel.

4. The wind turbine of claim 1, wherein the discretely variable diameter gear box is capable of shifting gears under full load without a clutch disengagement or torque discontinuation.

5. A method of harnessing wind energy to operate an electric power grid by means of a wind turbine, comprising:
converting wind energy from wind striking rotor blades to mechanical energy of a rotating rotor shaft that the rotor blades are attached to, the rotor blades and rotor shaft having variable rotational speeds;
transferring the variable rotational speed of the rotor shaft to a variable rotational speed of a gear box input shaft;
converting the variable rotational speed of the gear box input shaft to a fixed rotational speed of a gear set output shaft by varying a diameter of a gear wheel in the gear box to create a variable gear ratio having non-continuous discrete magnitudes, the variable gear ratio reflecting the variable rotational speed of the rotor blades; and
transmitting the fixed rotational speed of the gear set output shaft to a generator operating at constant frequency, the generator coupled directly to an electric power grid.

6. The method of claim 5, further including the generator transmitting power to the electric power grid without a power converter.

7. The method of claim 5, further including preparing the shifting of the diameter of the gear wheel of the gear box by rotating a differential control shaft of a differential in a direction consistent with an increased speed of the rotor blades, an input of the differential either doubling as or being coupled to an output of the gear set output shaft.

8. The method of claim 5, further including using a differential to limit torque spikes from discrete changes in a gear ratio of the gear box.

9. A wind turbine, comprising:
a rotor shaft having thereon rotor blades exposed to wind energy from varying wind speeds;
a gear box including a discretely variable ratio gear set, the gear box receiving varying rotational energy from a varying rotational speed of the rotor shaft, the discretely variable ratio gear set having a fixed speed output and including a discretely variable diameter gear; and
a generator receiving fixed speed output from the gear box, the generator operating at constant frequency and coupled to an electric power grid operating at the constant frequency.

10. The wind turbine of claim 9, wherein a differential is positioned between the discretely variable ratio gear set and the generator.

11. The wind turbine of claim 10, wherein the differential is gear set that has a planetary configuration.

12. The wind turbine of claim 10, wherein the differential is a gear set that acts as a speed increasing stage.

13. The wind turbine of claim 10, wherein the differential is configured to adjust rotor speed without shifting a diameter of the discretely variable diameter gear.

14. The wind turbine of claim 9, wherein the efficiency of the wind turbine is optimized.

15. An apparatus for wind turbines having a rotor shaft and rotor blades and having a generator connected to an electric power grid, the apparatus comprising:
a discretely variable ratio gear set of a gear box receiving varying rotational energy from a varying rotational speed of the rotor shaft, the discretely variable diameter gear box having a fixed speed output and including a gear wheel whose diameter can be varied, the discretely variable diameter gear box having a gear set output shaft;
a differential coupled to an output shaft of the discretely variable ratio gear set, the differential having a differential output shaft and a differential control shaft, the differential control shaft facilitating shifting of diameters of a gear wheel in the discretely variable ratio gear set, the gear box capable of being utilized in both fixed pitch and variable pitch turbines.

16. The apparatus of claim 15, wherein the discretely variable ratio gear set includes a pinion gear whose shaft is the discretely variable ratio gear set output shaft and an idler gear whose axle is not connected to power, the idler gear moving along the pinion gear and the gear wheel when a diameter of the gear wheel is shifted.

17. A method of retrofitting a wind turbine coupled to a power grid through power electronics, the wind turbine having a fixed ratio gear box, the method comprising:
removing the power electronics between the generator and the power grid;
connecting the generator to the power grid; and
replacing the fixed ratio gear box with a discretely variable ratio gear box that receives varying rotational energy from a varying rotational speed of the rotor shaft and that has a fixed speed output.

18. The method of claim 17, further including adding a differential between the discretely variable ratio gear box and the generator.

19. A method of retrofitting a fixed speed fixed pitch wind turbine that has a generator operating at a constant frequency, the generator coupled directly to a power grid that operates at the constant frequency, the method comprising:
replacing the fixed ratio gear box situated between a rotor shaft and the generator with a discretely variable ratio gear box, the discretely variable ratio gear box receiving varying rotational energy from a varying rotational speed of the rotor shaft and having a fixed speed output that is transferred to the generator.

20. The method of claim 19, further including coupling the discretely variable ratio gear box to a planetary gear that is coupled to the rotor shaft.

21. The method of claim 19, further including using a differential positioned between the discretely variable ratio gear box and the generator to smoothen a shifting of a diameter of a gear wheel of the discretely variable ratio gear box and to limit a torque in the discretely variable ratio gear box.

22. A method of gear shifting in a wind turbine, comprising:
coupling a differential to a gear set output shaft of a gear box of the wind turbine, the differential having a differential output shaft connected to a generator and having a differential control shaft; and
as rotor speed increases from increased wind energy, in a first step accelerating a rotation of the differential control shaft in a direction consistent with increased rotor speed while maintaining fixed a diameter of a gear wheel in the gear box and in a second step shifting a diameter of a gear wheel in the gear box upward by a gear tooth while slowing the differential output shaft down to zero.

23. A method of limiting a power of a stall controlled wind turbine having rotor blades and having a generator coupled directly to an electric power grid, the method comprising:
replacing the fixed ratio gear box situated between a rotor shaft and the generator with a discretely variable ratio gear box; and
controlling a degree to which the rotor blades stall without varying a pitch of the rotor blades by using the discretely variable ratio gear box to vary a speed of the rotor blades, the discretely variable ratio gear box receiving varying rotational energy from a varying rotational speed of the rotor shaft and outputting a fixed speed.

24. A wind turbine, comprising:
a rotor shaft having thereon rotor blades exposed to wind energy from varying wind speeds;
a gear box including a variable ratio gear set, the gear box receiving varying rotational energy from a varying rotational speed of the rotor shaft, the variable ratio gear set having a fixed speed output and including a gear set output shaft;
a generator receiving fixed speed output from the gear box, the generator operating at constant frequency and coupled to an electric power grid operating at the constant frequency, the generator transmitting power to the electric power grid without a power converter; and
a differential between the variable ratio gear set and the generator, the differential including a differential control shaft, the differential control shaft configured to adjust rotor speed by increasing or decreasing a speed of the gear set output shaft.

25. The wind turbine of claim 24, wherein the differential is gear set that has a planetary configuration.

26. The wind turbine of claim 24, wherein the differential is a gear set that is configured to act as a speed increasing stage.

27. The wind turbine of claim 24, wherein the differential is a gear set that is configured to act as a speed decreasing stage.

28. A wind turbine, comprising:
a rotor shaft having thereon rotor blades exposed to wind energy;
a first stage gear set on the rotor shaft, the first stage gear set being a fixed ratio gear and having a first stage gear set output shaft;
a variable ratio gear set coupled to the first stage gear output shaft and having a gear set output shaft;
a generator operating at a constant frequency and coupled to an electric grid that operates at the constant frequency, the generator transmitting power to the electric power grid without a power converter; and
a differential on the gear set output shaft, the differential having a differential output shaft and a differential control shaft, the differential control shaft facilitating changing the gear box ratio by increasing or decreasing a speed of the gear set output shaft in order to adjust rotor speed without shifting a diameter of the variable ratio gear, the differential output shaft coupled to the generator.

29. The wind turbine of claim 28, wherein the differential is gear set that has a planetary configuration.

30. The wind turbine of claim 28, wherein the differential is a gear set that is configured to act as a speed increasing stage.

31. The wind turbine of claim 28, wherein the differential is a gear set that is configured to act as a speed decreasing stage.

32. A wind turbine, comprising:
a rotor shaft having thereon rotor blades exposed to wind energy from varying wind speeds;
a gear box including a gear set, the gear box receiving rotational energy from a rotational speed of the rotor shaft, the gear set having a fixed ratio and including a gear set output shaft;
a generator receiving fixed speed output from the gear box, the generator operating at constant frequency and coupled to an electric power grid operating at the constant frequency, the generator transmitting power to the electric power grid without a power converter; and
a differential positioned between the gear set and the generator, the differential including a differential control shaft, the differential control shaft of the differential configured to adjust rotor speed by increasing or decreasing a speed of the gear set output shaft.

33. The wind turbine of claim 32, wherein the gear set is one of a fixed ratio gear set and a variable ratio gear set.

34. The wind turbine of claim 33, wherein the gear set is a variable ratio gear.

35. The wind turbine of claim 33, wherein the gear set is a fixed ratio gear.

36. A method of retrofitting a wind turbine coupled to a power grid through power electronics, the wind turbine having a fixed ratio gear box, the method comprising:
removing the power electronics between the generator and the power grid;
connecting the generator to the power grid so that the generator transmits power to the electric power grid without a power converter;
replacing a fixed ratio gear box with a variable ratio gear box that receives varying rotational energy directly or indirectly from a varying rotational speed of the rotor shaft and that has a fixed speed output, the variable ratio gear box comprising a differential, the differential connected to the generator, the differential including a differential control shaft that is configured to adjust rotor speed by increasing or decreasing a speed of one of (i) a gear set output shaft connected to the rotor shaft and (ii) the rotor shaft.

37. The wind turbine of claim 36, wherein the differential is gear set that has a planetary configuration.

38. The wind turbine of claim 36, wherein the differential is a gear set that is configured to act as a speed increasing stage.

39. The wind turbine of claim 36, wherein the differential is a gear set that is configured to act as a speed decreasing stage.

* * * * *